United States Patent
Rosenzweig et al.

(10) Patent No.: US 11,438,264 B2
(45) Date of Patent: Sep. 6, 2022

(54) TECHNIQUES FOR IMPROVING DATA TRANSMISSION IN TELEOPERATION SYSTEMS VIA DYNAMIC PACKET ROUTING

(71) Applicant: OTTOPIA TECHNOLOGIES LTD., Tel Aviv (IL)

(72) Inventors: Amit Rosenzweig, Tel Aviv (IL); Alex Kirshon, Netanya (IL)

(73) Assignee: Ottopia Technologies Ltd., Tel Aviv (IL)

( * ) Notice: Subject to any disclaimer, the term of this patent is extended or adjusted under 35 U.S.C. 154(b) by 0 days.

(21) Appl. No.: 17/191,329

(22) Filed: Mar. 3, 2021

(65) Prior Publication Data

US 2021/0281511 A1    Sep. 9, 2021

Related U.S. Application Data

(60) Provisional application No. 62/984,917, filed on Mar. 4, 2020.

(51) Int. Cl.
| | |
|---|---|
| *H04L 45/00* | (2022.01) |
| *H04L 1/00* | (2006.01) |
| *H04L 43/08* | (2022.01) |
| *H04L 65/70* | (2022.01) |
| *H04L 67/52* | (2022.01) |

(52) U.S. Cl.
CPC .............. *H04L 45/70* (2013.01); *H04L 1/004* (2013.01); *H04L 43/08* (2013.01); *H04L 65/70* (2022.05); *H04L 67/52* (2022.05)

(58) Field of Classification Search
CPC ......... H04L 45/70; H04L 1/004; H04L 43/08; H04L 65/607; H04L 67/18
See application file for complete search history.

(56) References Cited

U.S. PATENT DOCUMENTS

| | | | |
|---|---|---|---|
| 9,906,243 B1* | 2/2018 | Arabaci | H03M 13/353 |
| 2006/0285489 A1* | 12/2006 | Francisco | H04L 41/5025 |
| | | | 370/465 |
| 2012/0278175 A1* | 11/2012 | Agarwal | G06Q 30/02 |
| | | | 705/14.64 |
| 2014/0357993 A1* | 12/2014 | Hiriyannaiah | H04N 19/124 |
| | | | 600/437 |
| 2020/0336398 A1* | 10/2020 | Thomas | H04L 41/20 |

* cited by examiner

*Primary Examiner* — Viet D Vu
(74) *Attorney, Agent, or Firm* — M&B IP Analysts, LLC

(57) ABSTRACT

Techniques for improving data transmission in teleoperation systems including a method for dynamic packet routing. The method includes identifying an optimal channel of a plurality of channels based on a network connectivity status of a system and historical connectivity data related to a current location of the system, wherein the system includes a plurality of network authorization devices, wherein each network authorization device is configured to enable communications via an associated channel; and routing packets to the optimal channel using the network authorization device associated with the optimal channel.

17 Claims, 10 Drawing Sheets

TECHNIQUES FOR IMPROVING DATA TRANSMISSION IN TELEOPERATION SYSTEMS VIA DYNAMIC PACKET ROUTING

CROSS-REFERENCE TO RELATED APPLICATIONS

This application claims the benefit of U.S. provisional application No. 62/984,917 filed on Mar. 4, 2020, the contents of which are hereby incorporated by reference.

TECHNICAL FIELD

The present disclosure relates generally to data transmission, and more specifically to improving quality and reliability of data transmission.

BACKGROUND

Teleoperation is the operation of a system or machine at a distance. For example, teleoperation may involve remote control of a vehicle by a person referred to as a teleoperator. An important facet of teleoperation is ensuring that complete and accurate data is promptly transmitted between the teleoperator and the system or machine being operated. This is particularly important in the vehicle context because teleoperation of a vehicle usually includes transmission of real-time video feeds as well as data from other sensors (e.g., LiDAR, Radar, etc.).

Further, when the machine or system being operated moves during operation (e.g., when a vehicle moves as a result of operation), network conditions may change. Sometimes, these changes result in worse network conditions that cause unreliable transmissions. For example, packets may be dropped, thereby providing incomplete data. These changes can therefore interfere with teleoperation and result in issues such as inability to properly operate the vehicle or delayed responses.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for dynamic packet routing. The method comprises: identifying an optimal channel of a plurality of channels based on a network connectivity status of a system and historical connectivity data related to a current location of the system, wherein the system includes a plurality of network authorization devices, wherein each network authorization device is configured to enable communications via an associated channel; and routing packets to the optimal channel using the network authorization device associated with the optimal channel.

Certain embodiments disclosed herein also include a non-transitory computer readable medium having stored thereon causing a processing circuitry to execute a process, the process comprising: identifying an optimal channel of a plurality of channels based on a network connectivity status of a system and historical connectivity data related to a current location of the system, wherein the system includes a plurality of network authorization devices, wherein each network authorization device is configured to enable communications via an associated channel; and routing packets to the optimal channel using the network authorization device associated with the optimal channel.

Certain embodiments disclosed herein also include a system for dynamic packet routing. The system comprises: a plurality of network authorization devices; a processing circuitry; and a memory, the memory containing instructions that, when executed by the processing circuitry, configure the system to: identify an optimal channel of a plurality of channels based on a network connectivity status of a system and historical connectivity data related to a current location of the system, wherein each network authorization device is configured to enable communications via an associated channel; and route packets to the optimal channel using the network authorization device associated with the optimal channel.

BRIEF DESCRIPTION OF THE DRAWINGS

The subject matter disclosed herein and other objects, features, and advantages of the disclosed embodiments will be apparent from the following detailed description taken in conjunction with the accompanying drawings.

DETAILED DESCRIPTION

Figure 1A:
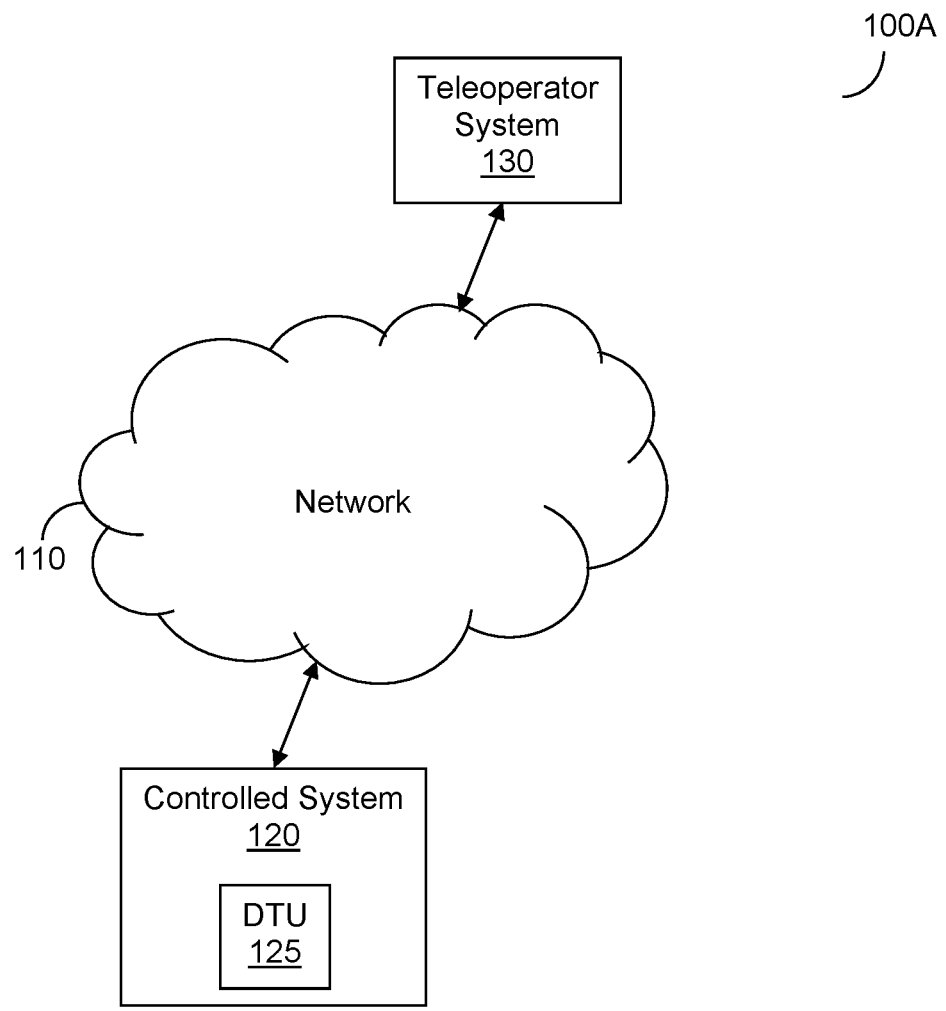
FIGS. 1A-B are network diagrams utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

To address the challenges noted above, the embodiments disclosed herein provide various techniques for improving data transmission and, in particular, data transmission over networks. In this regard, it has been identified that some teleoperation applications require high bandwidth, ultra-low latency communications, and that existing networks often used for teleoperation are often not designed to support high bandwidth and ultra-low latency communication from moving systems. Accordingly, the disclosed embodiments provide techniques that allow for adapting to the requirements of teleoperation and other applications requiring high bandwidth, low latency data transmission.

Figure 1B:
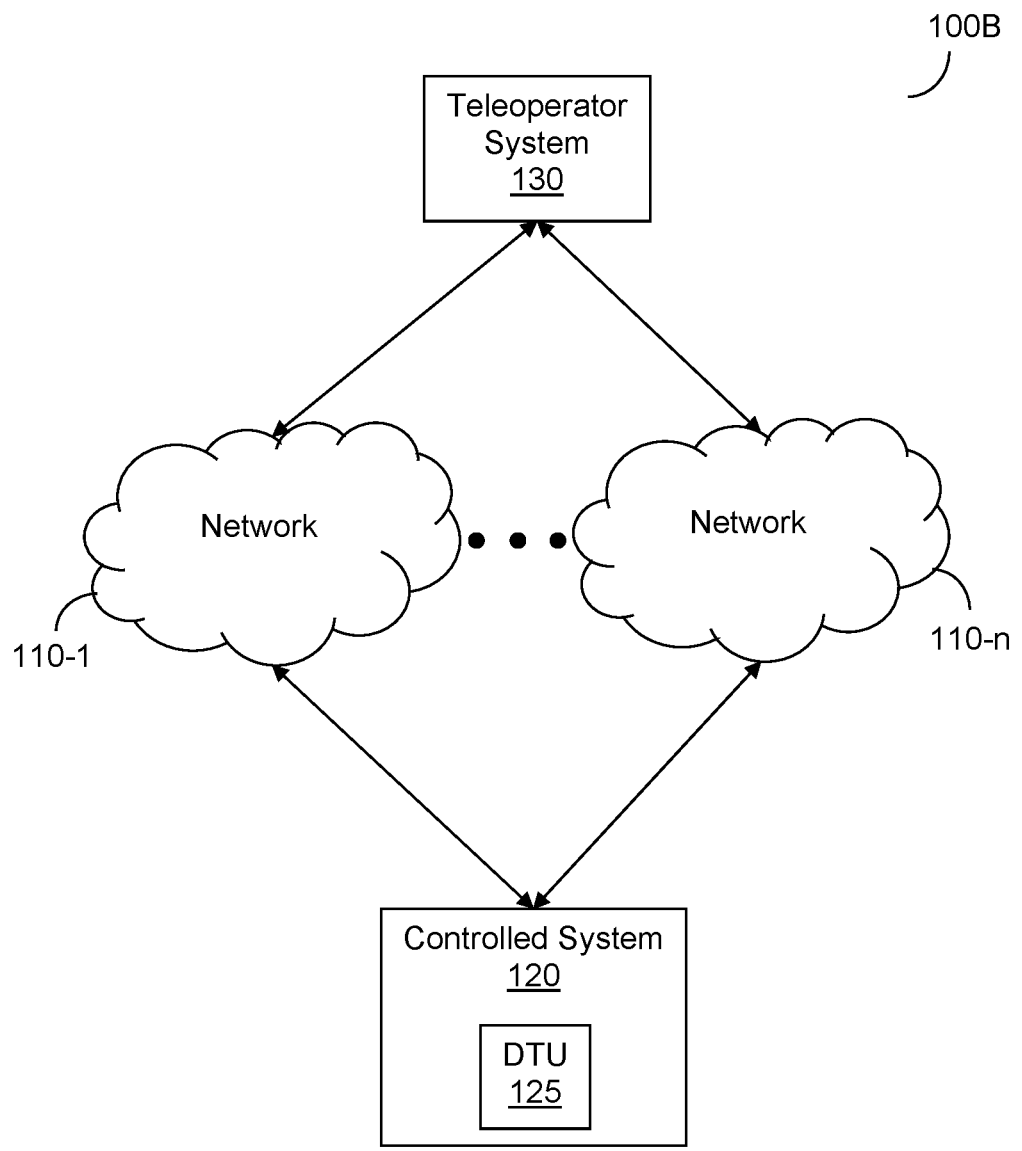

FIGS. 1A-B show example network diagrams 100A and 100B, respectively, utilized to describe the various disclosed embodiments.

In the example network diagram 100A, a controlled system 120 and a teleoperator system 130 communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof. In an example implementation, the network 110 may be or may include a cellular or other mobile network.

The controlled system 120 is controlled by a teleoperator using the teleoperator system 130. In an embodiment, the controlled system 120 includes a data transmission unit (DTU) 125. In a further embodiment, the data transmission unit 125 is configured to perform one or more of the disclosed embodiments. A schematic diagram showing components of the data transmission unit 125 according to an example implementation is described further below with respect to FIG. 8.

The teleoperator system 130 may be, but is not limited to, a personal computer, a laptop, a tablet computer, a smartphone, a wearable computing device, or any other device capable of receiving and displaying data. The teleoperator system 130 may include or be connected to one or more user interface devices (not shown in FIG. 1) in order to allow the teleoperator using the teleoperator system 130 to provide inputs for remotely operating the controlled system 120. In an embodiment, the teleoperator system 130 is configured to perform one or more of the disclosed embodiments and, in particular, at least a portion of the embodiments described below with respect to FIG. 4. An example schematic diagram of the teleoperator system 130 is described below with respect to FIG. 9.

In the example network diagram 100B, the controlled system 120 is depicted as communicating via multiple networks 110-1 through 110-$n$, where n is an integer having a value of 2 or greater. In an embodiment, the controlled system 120 is configured to switch between use of the networks 110-1 through 110-$n$ in order to optimize data transmission, for example as described below with respect to FIG. 2. To this end, in a further embodiment, the controlled system 120 includes multiple network authorization devices (e.g., Subscriber Identity Module, or SIM, cards, not shown in FIG. 1) that authorize the controlled system 120 to communicate via the different networks 110-1 through 110-$n$.

It should be noted that the example network diagrams 100A and 100B are merely illustrative and do not limit any of the disclosed embodiments. In particular, the teleoperator device 130 is shown as communicating directly with the network 110 of FIG. 1A and directly with the networks 110-1 through 110-$n$ of FIG. 1B merely for simplicity. The teleoperator device 130 may communicate with such networks 110 indirectly (e.g., through another network [not shown] that the teleoperator device 130 is authorized to communicate via) without departing from the scope of the disclosed embodiments.

Figure 2:
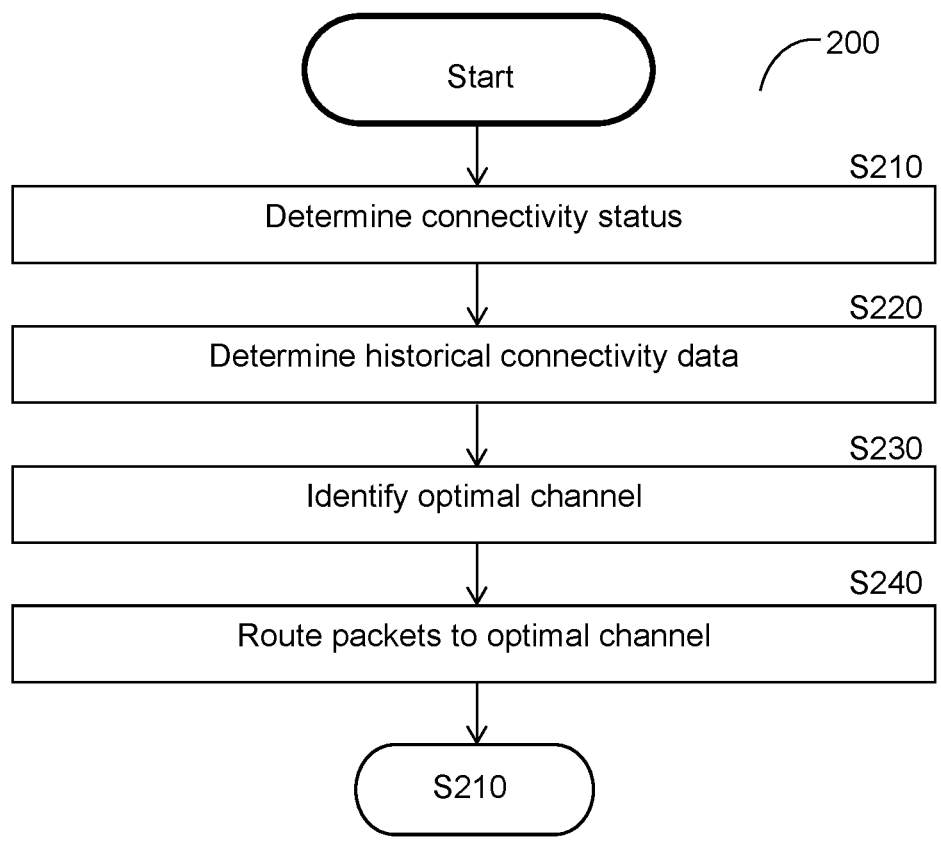
FIG. 2 is a flowchart illustrating a method for dynamic packet routing according to an embodiment.

FIG. 2 is an example flowchart 200 illustrating a method for dynamic packet routing according to an embodiment. In an embodiment, the method is performed by the data transmission unit 125, FIGS. 1A-B.

It has been identified that switching between networks provides opportunities for improving data transmission when the data is being transmitted from a moving system (e.g., a vehicle). More specifically, as the system moves, network connections may become weaker. When performance of the network (as measured by one or more network parameters) becomes insufficient, appropriate quality of data transmission may be maintained by switching networks. This is particularly important when teleoperating a vehicle, as such teleoperation requires high quality video in real-time such that poor network performance may lead to problems such as losing control of the vehicle.

To this end, FIG. 2 illustrates techniques for switching between networks via controlled systems (e.g., the controlled system 120) including multiple network authorization devices (e.g., SIM cards) in order to dynamically route packets. When used correctly in coordination, multiple network authorization devices can provide higher throughput, improved network coverage, less packet loss, and overall lower latency.

A network authorization device stores network-specific data used for authenticating and identifying subscribers on a network, thereby enabling access to the network. In this regard, it is noted that many networks require users to be authenticated prior to accessing the network.

At S210, network connectivity status and a current location of a system using the network connection (e.g., the controlled system 120) are determined. The network connectivity status includes one or more network parameters such as, but not limited to, speed, latency, bandwidth, and the like. The location may be, but is not limited to, a geographic location.

The network connectivity status may be determined based on immediately observable data (e.g., data measured from the controlled system), data transmission statistics (i.e., statistics measured from end-to-end), or both. Non-limiting examples for immediately observable data include, but are not limited to, per-modem data (i.e., data of each modem communicating using a network authorization device such as one of the network authorization devices 850, FIG. 8), location and movement data (e.g., geographical location, relative position [e.g., distance and angle] to a base station, speed, etc.), type of setting in which the connected system is deployed (e.g., urban or rural), combinations thereof, and the like.

The per-modem data may include, but is not limited to, operator name, network type (e.g., 3G, 4G), signal quality indicators (e.g., received signal strength indication, signal-to-noise ratio, reference signal received power, reference signal received quality, Ec/Io, etc.), combinations thereof, and the like. The data transmission statistics may include, but are not limited to, number of packets attempted to send, packet latency on arrival, number of packets lost, number of out of order packets, combinations thereof, quality of video output, and the like.

At S220, historical connectivity data for the current location of the system is determined. The historical connectivity data includes network parameters at various locations, and may include network parameters of the system, of other systems, or both. To this end, S220 includes comparing the current location of the system to locations associated with each portion of a database of historical connectivity data in order to determine a relevant portion of the database to be used as the historical connectivity data for the current location.

In some implementations, using historical connectivity data for the system of the same vehicle rather than for various other vehicles may allow for more accurately determining optimal channels for transmitting data since network connectivity may differ among vehicles.

At S230, based on the current network connectivity status and the historical connectivity data for the current location, an optimal channel for transmitting data is identified. The optimal channel may be identified from among, but not limited to, channels of the same network, channels of different networks, or a combination thereof.

In an embodiment, the optimal channel may be identified at least partially based on the historical connectivity data and, more specifically, based on historical performance with respect to different channels. To this end, in a further embodiment, channels may be analyzed with respect to the historical per-modem data and the data transmission statistics by reconciling such data using respective reference timestamps. The reconciling includes matching portions of the historical per-modem data to respective portions of the historical data transmission statistics based on the respective time at which each portion was collected. Reconciling this data allows for assessing how data transmission is affected by different modems, which in turn is utilized to determine the most optimal channel for different circumstances.

More specifically, the historical performance data may be utilized to predict subsequent performance for each channel. The optimal channel may be selected based on this prediction. As a non-limiting example for predicting subsequent performance based on historical performance, a number of late packets and a number of on time packets indicated in historical performance data may be utilized to predict a throughput. Different aspects of historical performance may be assigned respective weights in order to allow for aggregating values representing these different aspects and, therefore, to compare aggregated values among channels in order to select the optimal channel. Such aspects may include transmission parameters such as, but not limited to, jitter, buffer value, encoder, forward error correction (FEC) size, and the like.

In some embodiments, the prediction may be performed using artificial intelligence. To this end, S230 may further include applying, to the current network connectivity status, a machine learning model trained based on historical connectivity status data in order to determine a value representing a quality of output. The machine learning model may be trained based on historical connectivity status data and historical data indicating the type of data being transmitted. As a non-limiting example, the type of data being transmitted may be a type of video with an adaptive number of frames per second, or adaptive bitrate, resolution and the like. The value representing quality of output may be based on one or more data transmission statistics. In some implementations, multiple quality of output values may be determined (e.g., using a machine learning model for each type of data transmission statistic), and the values may be aggregated for each channel. Aggregating the values may further include applying weights to each value. Based on the aggregated values, an optimal channel (e.g., a channel having the highest aggregated value) is determined.

At S240, packets are routed to the identified optimal channel using the network authorization device associated with the optimal channel. In an embodiment, S240 includes switching to use of a network authorization device (e.g., a SIM card) of the selected channel. When the optimal channel is the same channel through which packets are currently being transmitted, S240 includes continuing routing packets to that channel.

In an embodiment, execution continues with S210 for selection of the next optimal channel. To this end, the method of FIG. 2 may be implemented using a control loop. Further, such control loop may be realized using components such as, but not limited to, a sensor, a controller configured to forward signals from the sensor, and a final control element configured to set parameters in order to maintain optimal settings. Thus, execution may loop such that changes in network conditions may be adapted to by continuously or repeatedly reselecting optimal channels.

Figure 3:
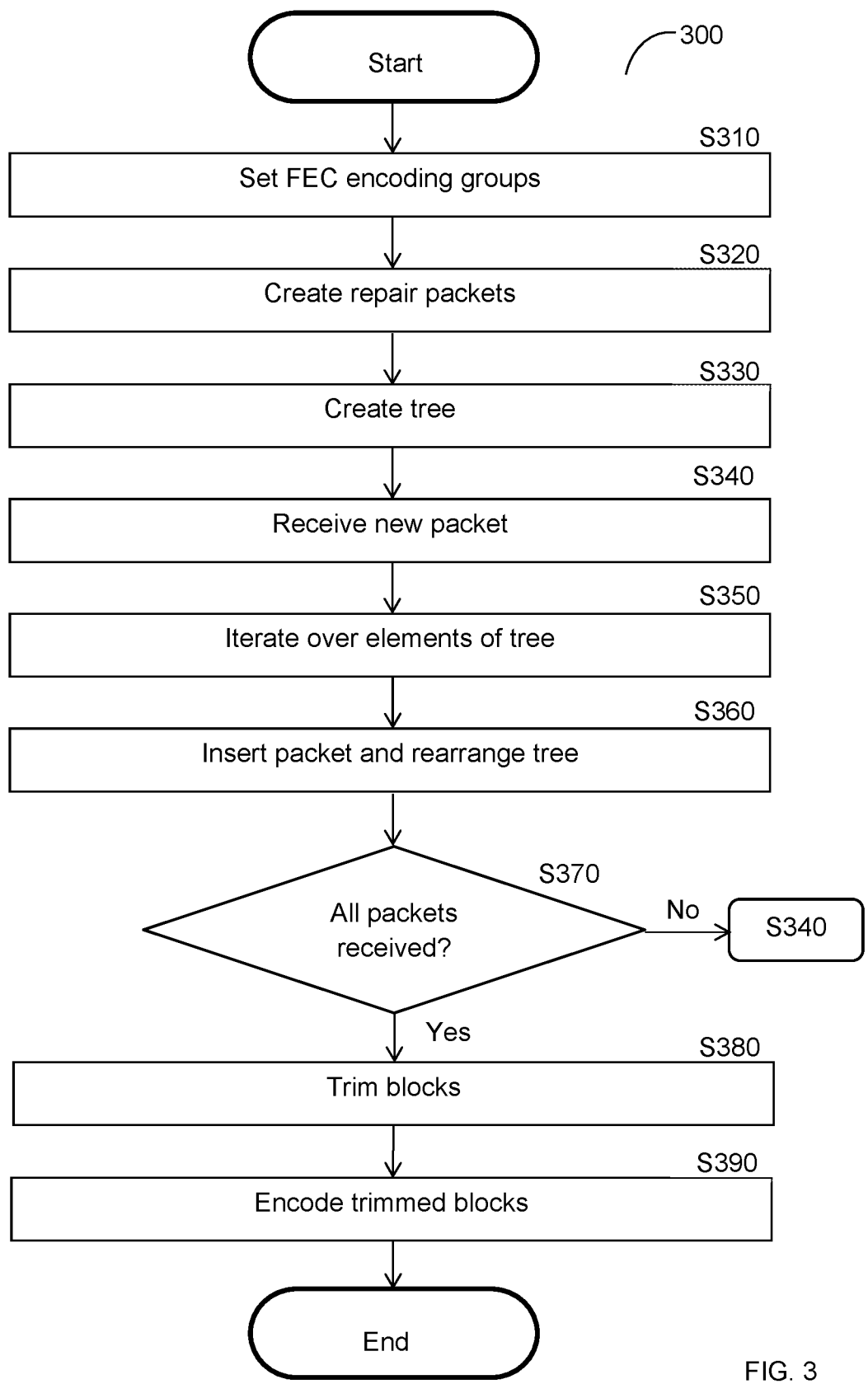
FIG. 3 is a flowchart illustrating a method for dynamic forward error correction according to an embodiment.

FIG. 3 is an example flowchart 300 illustrating a method for dynamic forward error correction according to an embodiment. In an embodiment, the method is performed by the data transmission unit 125, FIGS. 1A-B.

It has been identified that, when working with streams of data, packets are not necessarily aggregated strictly according to maximum transmission unit (MTU) size. As a result, small packets may require padding with null value data (e.g., a series of zeroes added onto the packet data), which creates unnecessary throughput overhead. To this end, FIG. 3 illustrates techniques for dynamic forward error correction (FEC) that reduce the need for padding and, therefore, improve throughput and minimize latency.

At S310, FEC encoding groups are set. In an embodiment, each FEC encoding group is set to a predetermined fixed size of packets.

At S320, repair packets are created. In an embodiment, the repair packets are created using a predetermined minimal number of blocks and a predetermined minimal block size per FEC encoding group.

At S330, a tree data structure (hereinafter a "tree") is created. In an embodiment, the tree is an increasing sorted tree. The tree includes nodes representing elements, where each element includes an identifier and a value. Each tree corresponds to one of the FEC groups.

The identifier of each element indicates the size left in each allocated packet in the FEC encoding group along with the MTU size. The identifier is used to determine an order of the tree. The value of each element indicates the number of allocated packets with the same remaining size as the packet corresponding to the element.

At S340, a new packet is received.

At S350, elements of the tree are iterated until a suitable element for the new packet is identified. In an embodiment, S350 includes comparing the size of the received packet to the identifier of the current element of the tree at each stage of iteration. As noted above, the identifier of an element indicates the remaining size in the data block corresponding to the element. In a further embodiment, an element is suitable when the identifier of the element indicates a remaining size that is greater than or equal to the size of the new packet.

At S360, the new packet is inserted into the FEC group of the identified suitable element and the tree is rearranged accordingly. To this end, S360 includes updating the identifier for the element and rearranging the tree based on the updated identifier.

At S370, it is determined if all new packets have been received and, if so, execution continues with S380; otherwise, execution continues with S340.

At S380, when all new packets have been received, blocks represented by elements of the tree are trimmed. In an embodiment, the trimming is based on the lowest remaining size block in the first element of the tree (i.e., the first element as indicated by the order of the tree). It should be noted that when packets of a FEC group have been received, the block size is known. This known block size is utilized for the initialization.

At S390, the trimmed blocks are encoded. The encoded blocks may then be sent to, for example a teleoperator (e.g., to the teleoperator device 130). For the repair packets, such blocks may be sent with a header including a map. In an embodiment, the map is an array including a number of cells and indicating a number of packets in each FEC group. Each cell's index in the array correlates to a packet's index within the group and contains the block identifier of the location in storage in which the packet was placed.

Once the blocks have been encoded, the blocks may be decoded in a similar manner. Specifically, once received, each received packet of a FEC group is directed to an array of the group's size. The number of blocks required for decoding is therefore known. In an embodiment, the decoding may begin when a minimal number of blocks have been received.

Figure 4:
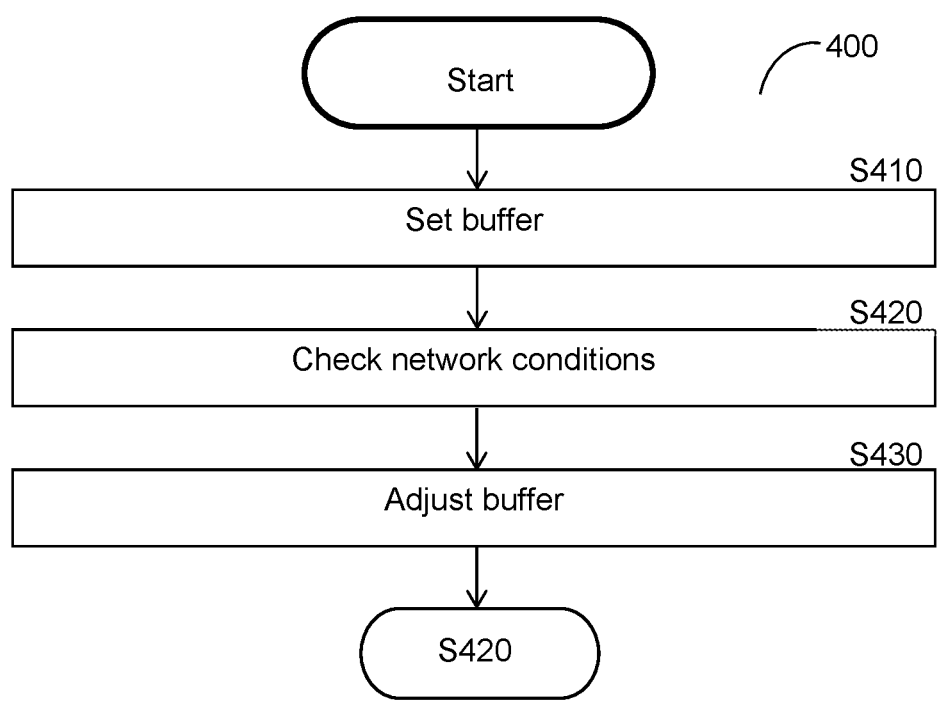
FIG. 4 is a flowchart illustrating a method for dynamic buffer adjustment according to an embodiment.

FIG. 4 is an example flowchart 400 illustrating a method for dynamic buffer adjustment according to an embodiment. In an embodiment, the method is performed by the teleoperator device 130, FIGS. 1A-B.

In applications such as teleoperation, minimizing latency may be critical to ensuring proper operation of controlled systems. It has been identified that dynamically adjusting the buffer at the receiver allows for ensuring optimal latency throughout operation. To this end, FIG. 4 provides techniques for dynamically adjusting the buffer which minimizes such latency.

At S410, a buffer is set. In an embodiment, the buffer may be initially set at a predetermined low value for latency (e.g., 50 milliseconds) and may be set to have variable duration.

At S420, network conditions are checked. The network conditions may be expressed as network parameters such as, but not limited to, speed, latency, and bandwidth.

At S430, based on the network conditions, the buffer is adjusted. In an embodiment, the buffer latency is decreased when network conditions are good and increased when network conditions are bad. In an embodiment, the buffer may be adjusted dynamically as network conditions change (e.g., periodically or as updates occur), thereby more accurately adjusting the buffer.

Whether network conditions are good or bad is determined based on the network parameters. Good or bad conditions may be determined for example based on, but not limited to, the conditions of a specific cellular cell. In an example implementation, network parameters are bad when one or more of the network parameters is below a respective threshold; otherwise, network parameters are good. In other implementations, whether network conditions are good or bad may be determined based on combinations of network parameters (e.g., by assigning weighted values representing the relative strength of each power and determining whether an aggregation of the weighted values is above or below a threshold.

In an example embodiment, whether network conditions are good or bad is determined based, in part, on the network jitter, i.e., the variance in time delay (e.g., as measured in milliseconds) between data packets over a network. In such an embodiment, network conditions may be good when, for example, jitter is less than or equal to 5 milliseconds such that network conditions are bad when jitter is greater than 5 milliseconds. In a further embodiment, whether network conditions are good or bad may be based on different thresholds for different uses. As a non-limiting example, when streaming a video at 30 frames per second, the delay between frames may be required to be at most 33.3 milliseconds. Thus, the threshold for bad network conditions may be 33.3 milliseconds. As a non-limiting example, latency may be initially set to 50 milliseconds. When network conditions are good, the latency may be modified to 20 milliseconds. When network conditions are bad, the latency may be returned to 50 milliseconds.

In an embodiment, execution continues with S420 for rechecking of network conditions and adjusting the buffer accordingly. To this end, the method of FIG. 4 may be implemented using a control loop. Further, such a control loop may be realized using components such as, but not limited to, a sensor, a controller configured to forward signals from the sensor, and a final control element configured to set parameters in order to maintain optimal settings. Thus, execution may loop such that changes in network conditions may be adapted to by continuously or repeatedly adjusting the buffer.

Figure 5:
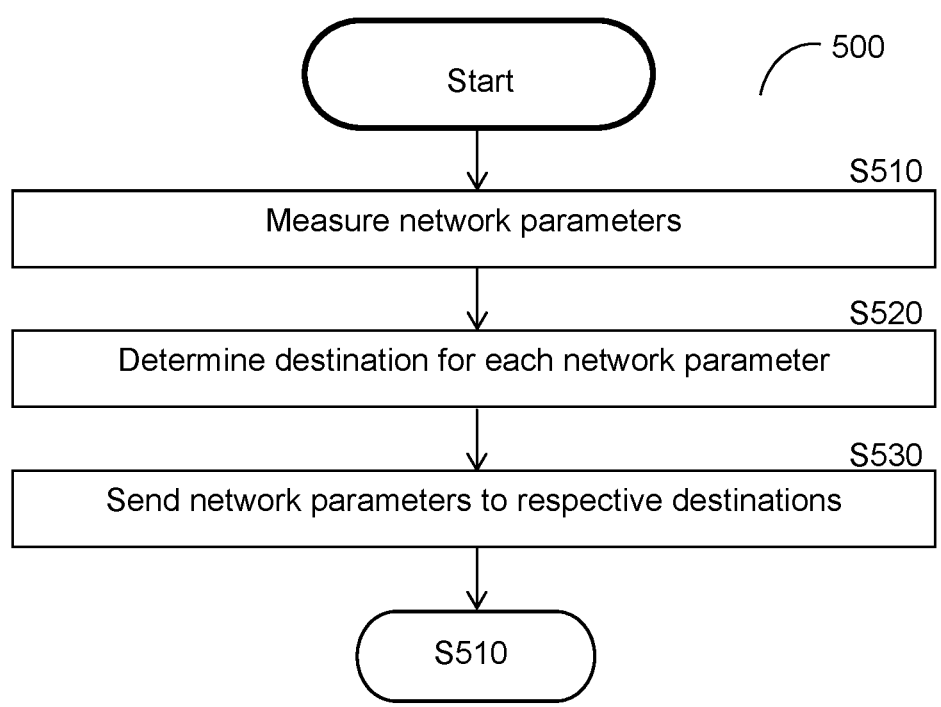
FIG. 5 is a flowchart illustrating a method for real-time data collection according to an embodiment.

FIG. 5 is an example flowchart 500 illustrating a method for real-time data collection according to an embodiment. In an embodiment, the method is performed by the data transmission unit 125, FIGS. 1A-B.

In order to effectively adjust configurations to changing network conditions, accurate measurement of network parameters is required. To this end, FIG. 5 provides techniques for collecting data used to measure various network parameters. It has also been identified that, in at least some applications, data must be collected frequently (e.g., multiple times a second) in order to provide suitable data and allow for rapid responses to changes in network conditions.

At S510, network parameters are measured. The measured parameters may include, but are not limited to, signal quality indicators, received power in each antenna, network latency, packet loss, throughput, and the like.

In an embodiment, S510 includes collecting data in response to events, collecting data periodically, or both. As a non-limiting example for an event response collection, data may be collected in response to a network disconnection, cell handover, jitter increasing above a threshold, and the like.

At S520, one or more destinations is determined for each measured network parameter. The destinations are logical components of a system responsible for various data transmission activities (e.g., activities including one or more of the disclosed embodiments or activities such as sending data, encoding data, preparing packet headers, etc.). The destinations for each network parameter include logical components that utilize the network parameter.

At S530, the network parameters are sent to their respective destinations.

In an embodiment, execution continues with S510 in order to determine new destinations for network parameters as needed. To this end, the method of FIG. 5 may be implemented using a control loop. Further, such control loop may be realized using components such as, but not limited to, a sensor, a controller configured to forward signals from the sensor, and a final control element configured to set parameters in order to maintain optimal settings. Thus, execution may loop such that changes in network conditions may be adapted to by continuously or repeatedly choosing destinations for network parameters.

Figure 6:
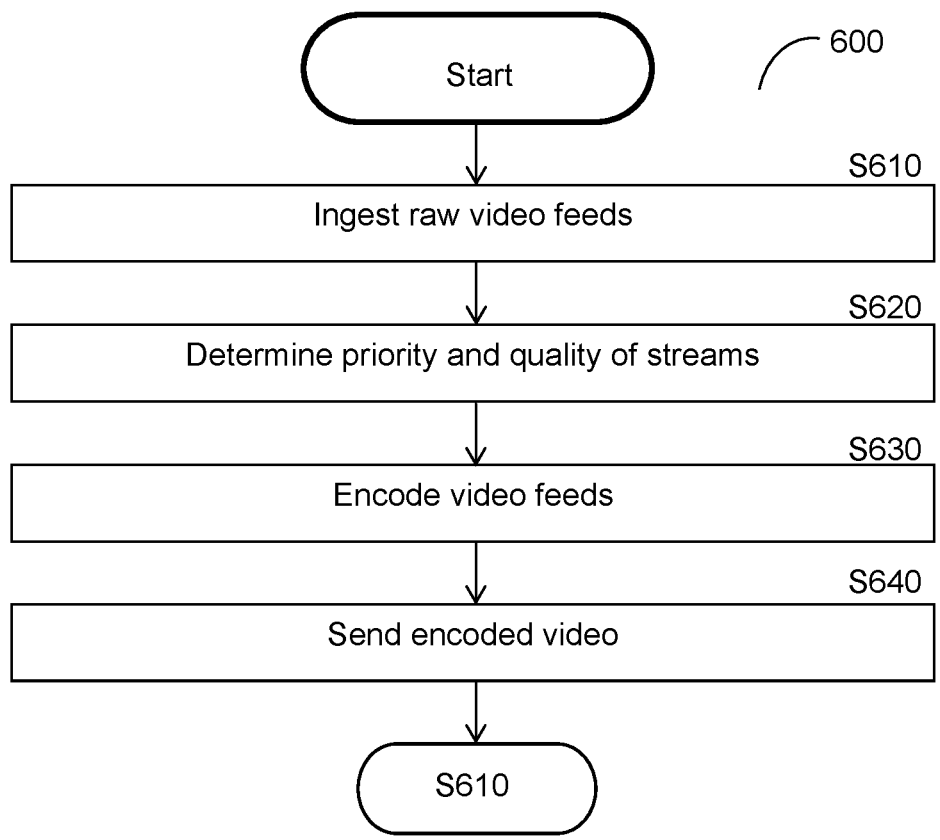
FIG. 6 is a flowchart illustrating a method for adaptive video compression according to an embodiment.

FIG. 6 is an example flowchart 600 illustrating a method for adaptive video compression according to an embodiment. In an embodiment, the method is performed by the data transmission unit 125, FIGS. 1A-B.

It has been identified that selectively utilizing different video feeds and adjusting encoding parameters allows for adapting data transmission to changing network conditions. As a non-limiting example, when network speed drops, using standard definition encoding rather than high definition encoding allows for ensuring optimal service level and continuous teleoperation even as network conditions change.

At S610, raw video feeds are ingested. The raw video feeds may be from one or more camera units, with each camera unit including one or more cameras. In an example implementation, the camera units may include one or more single camera unit, one or more two camera units, one or more four camera units, and one or more 6 camera units. In a further implementation, more cameras may be supported by combining units (e.g., two 6 camera units may be combined to support 12 cameras). Such combinations of units provide modularity and allow for camera units including numbers of cameras other than the default numbers of camera in each camera unit.

At S620, priority and quality of streams based on the raw video feeds are determined. The quality of the streams may be based on, but is not limited to, network condition parameters such as upload speed (i.e., total throughput) for each respective camera unit. In an example implementation, camera units may be prioritized based on the quality, i.e., camera units having higher quality streams may be prioritized since they can accommodate better quality encoded video feeds.

At S630, the raw video feeds are encoded based on the priority and quality of their respective streams. In an embodiment, the raw video feeds are encoded to optimize service level while ensuring continuous operation. To this end, S630 may include changing encoding parameters based on the priority and quality. The configuration parameters may include, but are not limited to, image resolution, number of frames per second, bitrate per stream, and the like. As a non-limiting example, high definition encoding may be utilized when the upload speed of the network is 15 Megabits per second (Mbps) and standard definition encoding may be utilized when the upload speed of the network is 5 Mbps.

In a further embodiment, the encoding parameters are changed without resetting any video stream. In yet a further embodiment, the encoding parameters are changed within a single video frame.

At S640, the encoded video is sent to a destination (e.g., to the teleoperator device 130).

In an embodiment, execution continues with S610 in order to update priority and quality of streams. To this end, the method of FIG. 6 may be implemented using a control loop. Further, such control loop may be realized using components such as, but not limited to, a sensor, a controller configured to forward signals from the sensor, and a final control element configured to set parameters in order to maintain optimal settings. Thus, execution may loop such that changes in network conditions may be adapted to by continuously or repeatedly updating priority and quality of streams.

Figure 7:
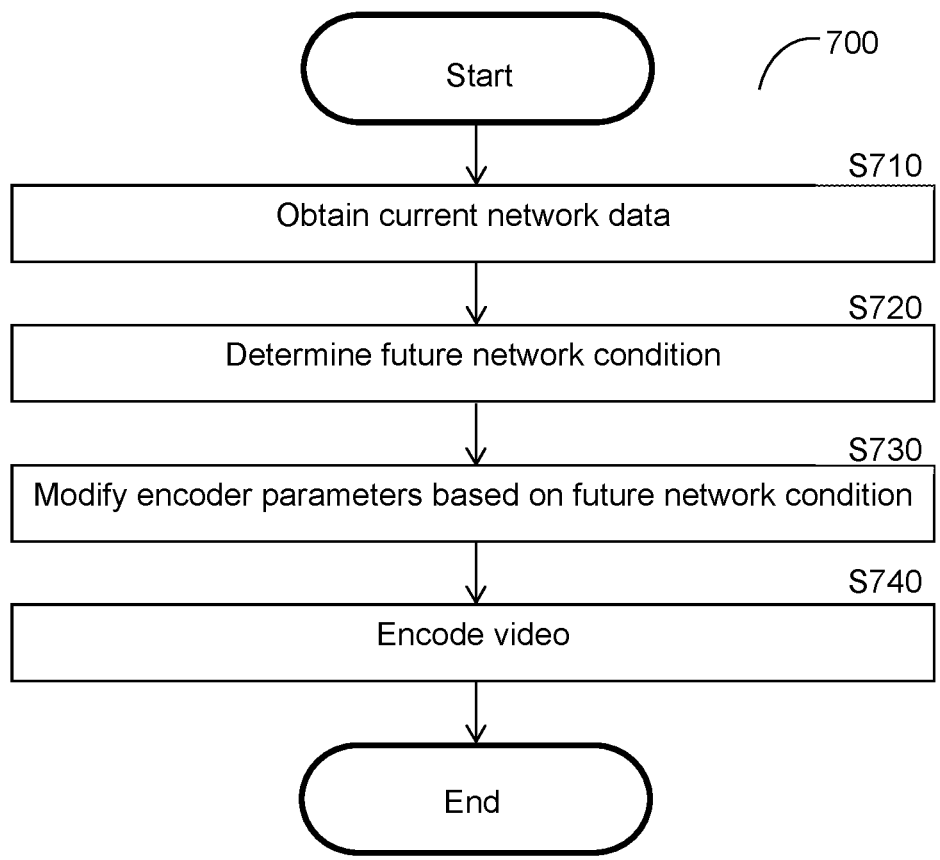
FIG. 7 is a flowchart illustrating a method for predictive video encoding according to an embodiment.

FIG. 7 is an example flowchart 700 illustrating a method for predictive video encoding according to an embodiment. In an embodiment, the method is performed by the data transmission unit 125, FIGS. 1A-B. The prediction may be performed using artificial intelligence techniques.

Many external factors may influence network conditions. As non-limiting examples, physical barriers such as bridges or tunnels may cause disconnections that can result in losing all video coverage at least momentarily. In applications such as teleoperation of vehicles, such video coverage loss is unacceptable. To this end, it has been identified that future events which may cause loss of network coverage may be predicted based on current network data and that knowledge of such future events may be utilized to reconfigure systems to minimize the chance of disconnection or other loss of coverage.

At S710, current network data is obtained. The network data may include, but is not limited to, speed, latency, bandwidth, external conditions (e.g., location of the system, location of networks accessible to the system, time, etc.), number of lost packets, number of late packets, signal quality parameters (e.g., signal strength, signal to noise ratio, signal to interference and noise ratio, signal quality indicator, etc.), or a combination thereof. The location of the system may be based on, for example, geographic location (e.g., as indicated by global positioning system coordinates), speed and direction of movement, planned travel path, or a combination thereof.

At S720, a predicted future network condition is determined. In an embodiment, the future network condition is determined based on the current network data and historical network data. As a non-limiting example, when the current network data indicates the system is moving toward a known location of a tunnel indicated in the historical network data, the future network condition may be predicted as limited or no connection.

In an embodiment, the future network condition may be determined using artificial intelligence by applying a machine learning model trained using a training set including historical network data. The artificial intelligence may be realized using machine learning technologies such as, but not limited to, regression trees, decision trees, neural networks, support vector machines, and the like. In a further embodiment, the machine learning model may be trained using a supervised or semi-supervised machine learning algorithm with at least a portion of the historical network data being labeled with corresponding future network conditions (e.g., a set of historical network data at a first time corresponding to another set of historical network data at a subsequent times).

At S730, based on the future network condition, encoder parameters are modified. In an embodiment, the encoder parameters are modified such that a connection is maintained if and when the future network condition is present.

In an embodiment, encoder parameters may only be modified if the predicted future network condition fails to meet one or more predetermined transmission quality criteria. Such criteria may include, but is not limited to, available throughput, packet loss, late arrival of packets, overall quality of experience, quality of video, quality of sounds, video frame rate, latency, and the like.

At S740, a video feed is encoded according to the modified encoder parameters.

Figure 8:
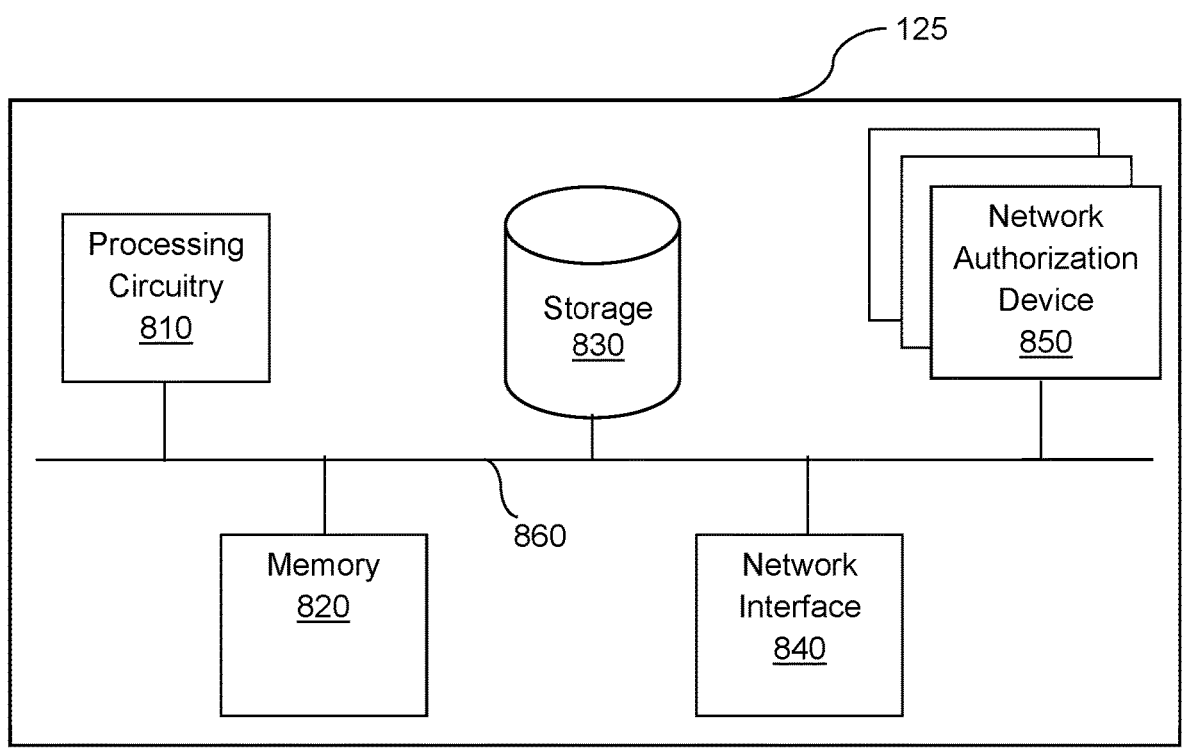
FIG. 8 is a schematic diagram of a data transmission unit according to an embodiment.

FIG. 8 is an example schematic diagram of a data transmission unit 125 according to an embodiment. The data transmission unit 125 includes a processing circuitry 810 coupled to a memory 820, a storage 830, a network interface 840, and one or more network authorization devices 850. In an embodiment, the components of the data transmission unit 125 may be communicatively connected via a bus 860.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 820 may be volatile (e.g., random access memory, etc.), non-volatile (e.g., read only memory, flash memory, etc.), or a combination thereof.

In one configuration, software for implementing one or more embodiments disclosed herein may be stored in the storage 830. In another configuration, the memory 820 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 840 allows the data transmission unit 125 to communicate with the teleoperator device 130 for the purpose of, for example, receiving data, sending data, and the like. In particular, sensor signals, images, video, and the like, may be sent to the teleoperator device 130 over a network (e.g., the network 110, FIG. 1) accessed using the network interface 840.

The network authorization devices 850 store data needed for accessing one or more networks. The network authorization devices 850 may be implemented as, but not limited to, an integrated circuit card (e.g., a subscriber identity module [SIM] card). The data stored by the network authorization device 850 may include, but is not limited to, an identification number (e.g., an international mobile subscriber identity number), a key, or both.

In an embodiment, the data transmission unit 125 includes multiple network authorization devices 850, which are utilized as described herein above with respect to FIG. 2. In a further embodiment, the multiple network authorization devices 850 may include one or more network authorization devices 850 used for communicating via each of multiple networks (e.g., multiple SIM cards, with each SIM card authorizing the data transmission unit 125 to communicate via a different network). In another embodiment, the multiple network authorization devices 850 may include multiple network authorization devices 850 used for communicating via the same network (e.g., two or more SIM cards each authorizing the data transmission unit 125 to communicate via the same network).

It should be understood that the embodiments described herein are not limited to the specific architecture illustrated in FIG. 8, and other architectures may be equally used without departing from the scope of the disclosed embodiments.

Figure 9:
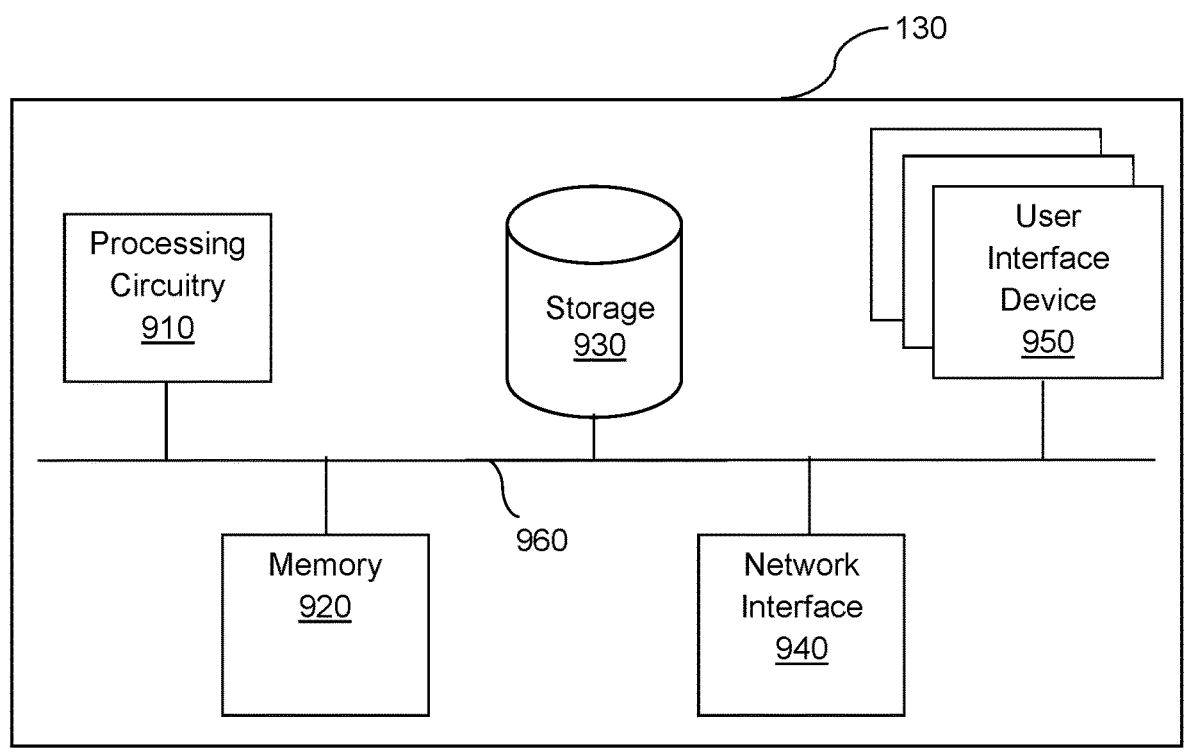
FIG. 9 is a schematic diagram of a teleoperator device according to an embodiment.

FIG. 9 is an example schematic diagram of the teleoperator device 130 according to an embodiment. The teleoperator device 130 includes a processing circuitry 910 coupled to a memory 920, a storage 930, a network interface 940, and one or more user interface devices 950. In an embodiment, the components of the teleoperator device 130 may be communicatively connected via a bus 960.

The processing circuitry 910 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 920 may be volatile (e.g., random access memory, etc.), non-volatile (e.g., read only memory, flash memory, etc.), or a combination thereof.

In one configuration, software for implementing one or more embodiments disclosed herein may be stored in the storage 930. In another configuration, the memory 920 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 910, cause the processing circuitry 910 to perform the various processes described herein.

The storage 930 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 940 allows the teleoperator device 130 to communicate with the data transmission unit 125 for the purpose of, for example, receiving data, sending data, and the like. In particular, sensor signals, images, video, and the like, may be received from the data transmission unit 125 over a network (e.g., the network 110, FIG. 1) accessed using the network interface 940.

The user interface devices 950 allow a user to provide inputs including, but not limited to, inputs needed for determining commands to send to the controlled system 120. As a non-limiting example, such inputs may be used to determine and send commands to control movement of a vehicle-controlled system 120. The user interface devices may include, but are not limited to, a mouse, keyboard, microphone, touch screen, combinations thereof, and the like.

It should be understood that the embodiments described herein are not limited to the specific architecture illustrated in FIG. 9, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for dynamic packet routing, comprising:
identifying an optimal channel of a plurality of channels based on a network connectivity status of a system and historical connectivity data related to a current location of the system, wherein the system includes a plurality of network authorization devices, wherein each network authorization device is configured to enable communications via an associated channel;
trimming blocks represented by elements of the tree data structure based on a lowest remaining block size in a first element of the elements of the tree data structure, wherein a block size of each of the blocks is based on the forward error correction groups into which the packets are inserted;
encoding each of the trimmed blocks, wherein the routed packets include the encoded blocks; and
routing packets to the optimal channel using a network authorization device of the plurality of network authorization devices that is associated with the optimal channel.

2. The method of claim 1, wherein routing the packets to the optimal channel further comprises:
switching from another channel of the plurality of channels to the optimal channel.

3. The method of claim 1, wherein the historical connectivity data further includes per-modem data and data transmission statistics, wherein identifying the optimal channel further comprises:
reconciling the per-modem data with the data transmission statistics based on timestamps associated with respective portions of the per-modem data and the data transmission statistics; and
analyzing historical performance of each of the plurality of channels based on the reconciled data, wherein the optimal channel is identified based further on the historical performance of each of the plurality of channels.

4. The method of claim 3, wherein identifying the optimal channel further comprises:
determining a predicted subsequent performance for the system using each of the plurality of channels based on the historical performance of each of the plurality of channels, wherein the optimal channel is identified based on the predicted subsequent performance for the system using each of the plurality of channels.

5. The method of claim 1, further comprising:
performing dynamic forward error correction on each of the packets to be routed to the optimal channel, wherein performing the dynamic forward error correction for each packet further comprises iterating elements of a tree data structure until a suitable element is identified for the packet and inserting the packet into a forward error correction group corresponding to the identified suitable element for the packet, wherein each forward error correction group is set to a predetermined fixed size of packets.

6. The method of claim 1, wherein the network connectivity status includes a plurality of network parameters, further comprising:
measuring the plurality of network parameters;
determining a respective destination for each of the plurality of network parameters, wherein each destination is a logical component of the system configured to perform at least one data transmission activity; and
sending each of the plurality of network parameters to its respective destination.

7. The method of claim 1, wherein the routed packets include compressed video data, further comprising:
creating the compressed video data by encoding a plurality of raw video feeds, wherein each of the plurality of raw video feeds is encoded using encoding parameters determined based on a priority and a quality of the raw video feed.

8. The method of claim 1, wherein the routed packets include compressed video data, further comprising:
determining a predicted future network condition based on current network data and historical network data; and creating the compressed video data by encoding a video feed, wherein encoding the video feed further comprises modifying encoder parameters based on the predicted future network condition.

9. A non-transitory computer readable medium having stored thereon instructions for causing a processing circuitry to execute a process, the process comprising:
  identifying an optimal channel of a plurality of channels based on a network connectivity status of a system and historical connectivity data related to a current location of the system, wherein the system includes a plurality of network authorization devices, wherein each network authorization device is configured to enable communications via an associated channel;
  trimming blocks represented by elements of the tree data structure based on a lowest remaining block size in a first element of the elements of the tree data structure, wherein a block size of each of the blocks is based on the forward error correction groups into which the packets are inserted;
  encoding each of the trimmed blocks, wherein the routed packets include the encoded blocks; and
  routing packets to the optimal channel using a network authorization device of the plurality of network authorization devices that is associated with the optimal channel.

10. A system for dynamic packet routing, comprising:
  a plurality of network authorization devices;
  a processing circuitry; and
  a memory, the memory containing instructions that, when executed by the processing circuitry, configure the system to:
  identify an optimal channel of a plurality of channels based on a network connectivity status of the system and historical connectivity data related to a current location of the system, wherein each network authorization device is configured to enable communications via an associated channel;
  trim blocks represented by elements of the tree data structure based on a lowest remaining block size in a first element of the elements of the tree data structure, wherein a block size of each of the blocks is based on the forward error correction groups into which the packets are inserted;
  encode each of the trimmed blocks, wherein the routed packets include the encoded blocks; and
  route packets to the optimal channel using a network authorization device of the plurality of network authorization devices that is associated with the optimal channel.

11. The system of claim 10, wherein the system is further configured to:
  switch from another channel of the plurality of channels to the optimal channel.

12. The system of claim 10, wherein the historical connectivity data further includes per-modem data and data transmission statistics, wherein the system is further configured to:
  reconcile the per-modem data with the data transmission statistics based on timestamps associated with respective portions of the per-modem data and the data transmission statistics; and
  analyze historical performance of each of the plurality of channels based on the reconciled data, wherein the optimal channel is identified based further on the historical performance of each of the plurality of channels.

13. The system of claim 12, wherein the system is further configured to:
  determine a predicted subsequent performance for the system using each of the plurality of channels based on the historical performance of each of the plurality of channels, wherein the optimal channel is identified based on the predicted subsequent performance for the system using each of the plurality of channels.

14. The system of claim 10, wherein the system is further configured to:
  perform dynamic forward error correction on each of the packets to be routed to the optimal channel, wherein performing the dynamic forward error correction for each packet further comprises iterating elements of a tree data structure until a suitable element is identified for the packet and inserting the packet into a forward error correction group corresponding to the identified suitable element for the packet, wherein each forward error correction group is set to a predetermined fixed size of packets.

15. The system of claim 10, wherein the network connectivity status includes a plurality of network parameters, wherein the system is further configured to:
  measure the plurality of network parameters;
  determine a respective destination for each of the plurality of network parameters, wherein each destination is a logical component of the system configured to perform at least one data transmission activity; and
  send each of the plurality of network parameters to its respective destination.

16. The system of claim 10, wherein the routed packets include compressed video data, wherein the system is further configured to:
  create the compressed video data by encoding a plurality of raw video feeds, wherein each of the plurality of raw video feeds is encoded using encoding parameters determined based on a priority and a quality of the raw video feed.

17. The system of claim 10, wherein the routed packets include compressed video data, wherein the system is further configured to:
  determine a predicted future network condition based on current network data and historical network data; and
  create the compressed video data by encoding a video feed, wherein encoding the video feed further comprises modifying encoder parameters based on the predicted future network condition.

* * * * *